US012366755B2

(12) United States Patent
Nagayoshi

(10) Patent No.: US 12,366,755 B2
(45) Date of Patent: Jul. 22, 2025

(54) CONTROL APPARATUS, DISPLAY APPARATUS, CONTROL METHOD, AND STORAGE MEDIUM

(71) Applicant: CANON KABUSHIKI KAISHA, Tokyo (JP)

(72) Inventor: Sota Nagayoshi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 18/452,220

(22) Filed: Aug. 18, 2023

(65) Prior Publication Data

US 2024/0077723 A1 Mar. 7, 2024

(30) Foreign Application Priority Data

Aug. 24, 2022 (JP) .................. 2022-133641

(51) Int. Cl.
*G02B 27/01* (2006.01)
*G02B 27/00* (2006.01)
*G09G 3/00* (2006.01)

(52) U.S. Cl.
CPC ....... *G02B 27/017* (2013.01); *G02B 27/0093* (2013.01); *G09G 3/002* (2013.01); *G02B 2027/0138* (2013.01); *G02B 2027/014* (2013.01); *G02B 2027/0181* (2013.01)

(58) Field of Classification Search
CPC .......... G06F 3/011; G06F 3/012; G06F 3/013; G09G 2310/04; G09G 2340/0407; G09G 2340/0414; G09G 2340/0421; G09G 2340/0457; G09G 2340/14; G02B 27/0093; G02B 27/017; G02B 2027/0179; G02B 2027/0181; G02B 2027/014; G02B 2027/0138

See application file for complete search history.

(56) References Cited

U.S. PATENT DOCUMENTS

2010/0165092 A1\* 7/2010 Yamaguchi ........ G02B 27/0093
348/78

FOREIGN PATENT DOCUMENTS

JP 6897268 B2 6/2021

\* cited by examiner

*Primary Examiner* — Nitin Patel
*Assistant Examiner* — Amen W Bogale
(74) *Attorney, Agent, or Firm* — Cowan, Liebowitz & Latman, P.C.

(57) ABSTRACT

A control apparatus is configured to control a display apparatus for displaying a partial image based on a partial area of an omnidirectional image or hemispherical image on a display surface. The control apparatus includes a memory storing instructions; and a processor configured to execute the instructions to generate the partial image by performing transformation processing for the partial area of the omnidirectional image or hemispherical image, detect a first position of a line of sight of a user on the display surface, and generate a first partial image based on the first position and display the first partial image on the display surface in a case where the first position is located within a predetermined area for a predetermined duration.

13 Claims, 10 Drawing Sheets

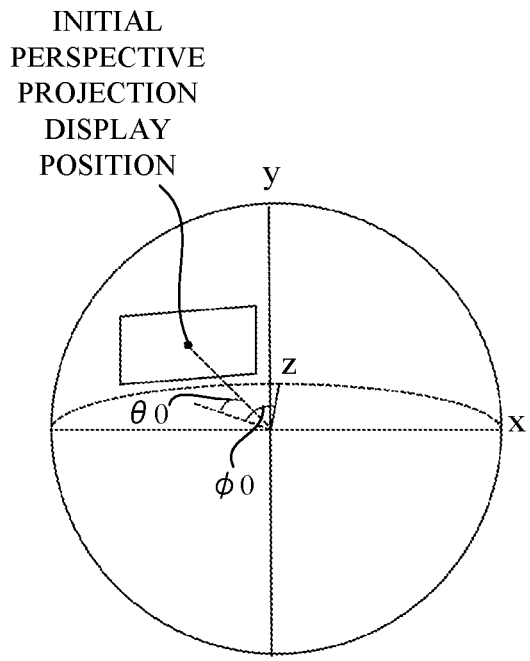
FIG. 9A
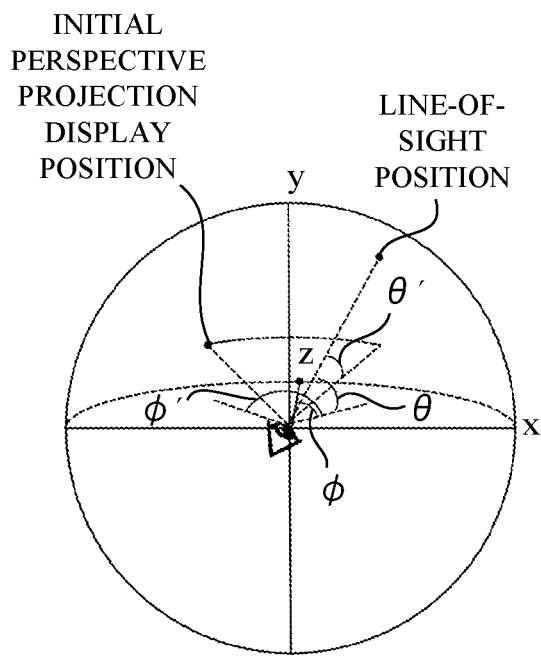
FIG. 9B
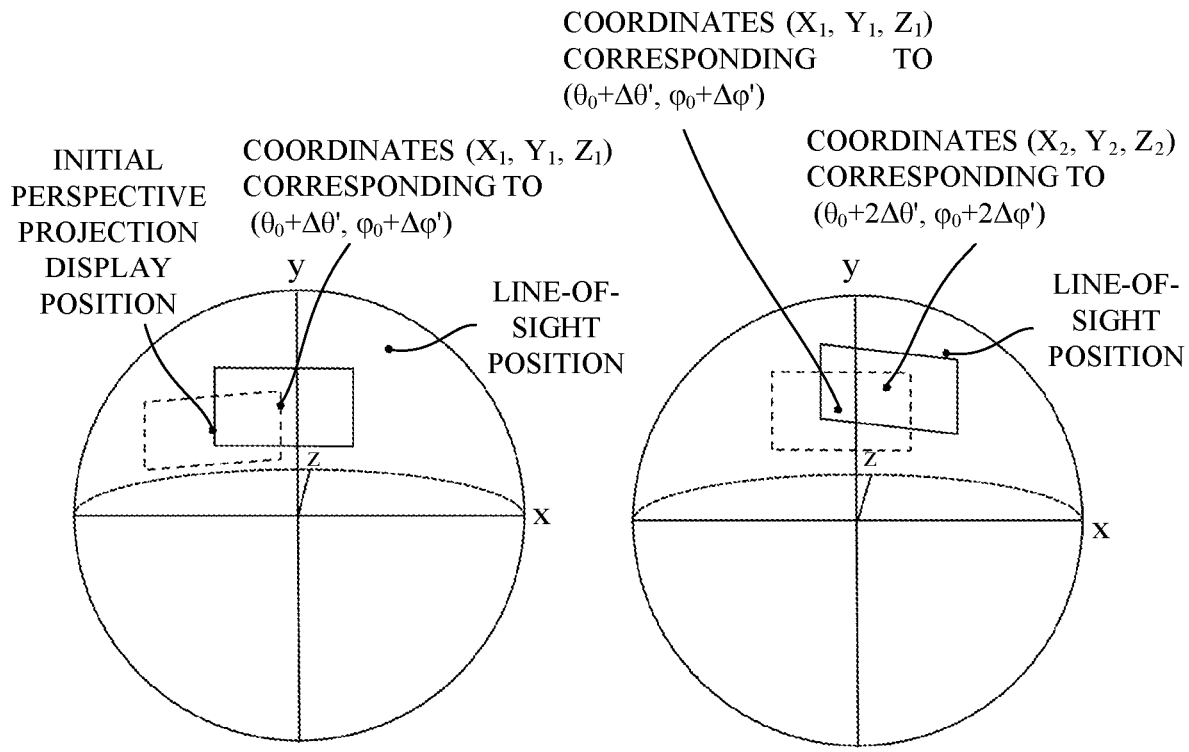
FIG. 9C
FIG. 9D

THREE-DIMENSIONAL POSITION MADE BY ADDING ANGLE AT LAST PERSPECTIVE PROJECTION POSITION TO $(\Delta\theta, \Delta\varphi)$ THREE-DIMENSIONAL POSITION AT DISPLAY RANGE LIMIT IN SEMISPHERICAL IMAGE (WHERE SHIFT STOPS)

CONTROL APPARATUS, DISPLAY APPARATUS, CONTROL METHOD, AND STORAGE MEDIUM

BACKGROUND

Technical Field

One of the aspects of the embodiments relates to a control apparatus, a display apparatus, a control method, and a storage medium.

Description of Related Art

Virtual reality (VR) contents are mainly viewed using a non-transmission type head mount display (TIMID) that covers the field of vision of the user with a display unit. Photos and videos for VR are captured with an image pickup apparatus (see Japanese Patent No. 6897268) that can capture wide-angle images such as omnidirectional (spherical) images at once.

In a case where the HMID cannot be brought to an imaging site in capturing photos and videos for VR, the user can confirm the photos and videos for VR in a way that is close to his naked eyes using perspective projection display in the image pickup apparatus body. The perspective projection display displays a partial area according to the viewing angle of the user (the entire screen is not displayed at once), and thus the viewpoint must be moved to confirm the surroundings. In a case where the viewpoint is moved using a touch panel or cross key, an object may shift from an intended position due to the contact between the user and an operation member of the image pickup apparatus.

SUMMARY

A control apparatus according to one aspect of the embodiment is configured to control a display apparatus for displaying a partial image based on a partial area of an omnidirectional image or hemispherical image on a display surface. The control apparatus includes a memory storing instructions, and a processor configured to execute the instructions to generate the partial image by performing transformation processing for the partial area of the omnidirectional image or hemispherical image, detect a first position of a line of sight of a user on the display surface, and generate a first partial image based on the first position and display the first partial image on the display surface in a case where the first position is located within a predetermined area for a predetermined duration. A display apparatus including the above control apparatus and a control method corresponding to the above control apparatus also constitute another aspect of the embodiment. A storage medium storing a program that causes a computer to execute the above control method also constitutes another aspect of the embodiment.

Further features of the disclosure will become apparent from the following description of embodiments with reference to the attached drawings.

BRIEF DESCRIPTION OF THE DRAWINGS

FIGS. 9A to 9F illustrate the perspective projection display by relative position specification in the second embodiment.

DESCRIPTION OF THE EMBODIMENTS

Figure 1:
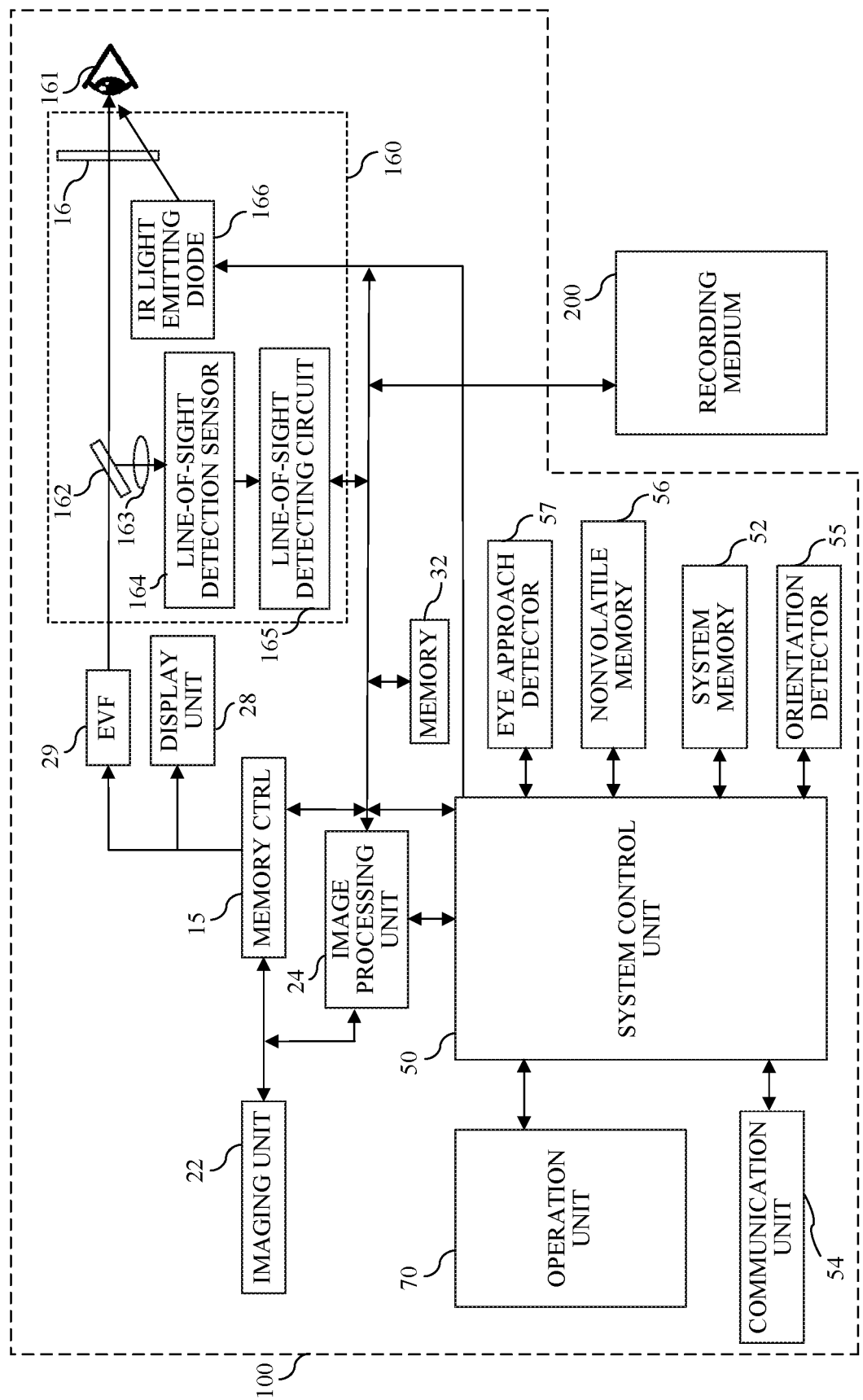
FIG. 1 is a block diagram of a digital camera as an example of a display apparatus according to one embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

FIG. 1 is a block diagram of a digital camera 100, which is an example of a display apparatus according to this embodiment.

An imaging unit 22 includes an image sensor, such as a CCD, CMOS device, or the like, configured to convert an optical image into an electrical signal.

An image processing unit (generating unit) 24 performs perspective projection transformation that can convert a partial area of a distorted wide-angle image such as a fisheye image captured by the imaging unit 22 into a partial image. The distorted wide-angle image is, for example, an image with an angle of view exceeding 180 degrees, images derived from projection methods such as equidistant projection, central projection, equisolid angle projection, and orthographic projection. Since the perspective projection transformation is performed by setting the viewing angle, the partial image is generated by converting part of the wide-angle image.

A memory control unit 15 controls transmission and reception of data between the image processing unit 24 and a memory 32. Output data from the imaging unit 22 is written into the memory 32 via the image processing unit 24 and the memory control unit 15. Alternatively, the output data from the imaging unit 22 is written into the memory 32 via the memory control unit 15 without passing through the image processing unit 24.

The memory 32 stores image data obtained by the imaging unit 22 and image data to be displayed on a display unit 28 and an electronic viewfinder (EVF) 29. The memory 32 has a storage capacity sufficient to store a predetermined number of still images, and moving images and sound for a predetermined time. The memory 32 also serves as an image display memory (video memory).

The image data for display written in the memory 32 is displayed by the display unit 28 or the EVF 29 via the memory control unit 15. Each of the display unit 28 and the EVF 29 displays information according to a signal from the memory control unit 15 on a display device such as an LCD or organic electro-luminescence (OEL). Live-view (LV) display can be made by sequentially transferring data accumulated in the memory 32 to the display unit 28 or the EVF 29 and displaying the data. An image displayed in the LV display will be referred to as a LV image hereinafter.

A line-of-sight detector 160 detects the user's line of sight (visual line) at an eyepiece unit 16 of the viewfinder. The line-of-sight detector 160 includes a dichroic mirror 162, an imaging lens 163, a line-of-sight detection sensor 164, a line-of-sight detecting circuit 165, and an infrared light emitting diode 166. The system control unit (control unit) 50 can execute predetermined processing according to the line-of-sight detection, and thus the line-of-sight detector 160 can also be part of the operation unit 70.

The line-of-sight detector 160 detects the line of sight by a method called a corneal reflection method. The corneal reflection method is a method for detecting the direction and position of the line of sight from a positional relationship between reflected light from the cornea in the eyeball 161 and the pupil in the eyeball 161 using infrared light emitted from the infrared light emitting diode 166. Any method other than the corneal reflection method may be used as long as the direction and position of the line of sight can be detected.

The infrared light emitting diode 166 is a light emitting element for detecting the direction and position of the user's line of sight in the viewfinder, and irradiates the eyeball 161 of the user with the infrared light. The infrared light emitted from the infrared light emitting diode 166 is reflected by the eyeball 161, and the reflected infrared light reflected on the eyeball 161 reaches the dichroic mirror 162. The dichroic mirror 162 reflects only the infrared light and transmits visible light. The reflected infrared light whose optical path has been changed forms an image on the imaging plane of the line-of-sight detection sensor 164 via the imaging lens 163. The imaging lens 163 is an optical element that constitutes the line-of-sight detection optical system. The line-of-sight detection sensor 164 includes an imaging device such as a CCD image sensor.

The line-of-sight detection sensor 164 photoelectrically converts the incident infrared reflected light into an electric signal and outputs the electric signal to the line-of-sight detecting circuit 165. The line-of-sight detecting circuit 165 detects the line-of-sight position of the user from the movement of the eyeball 161 based on the output signal of the line-of-sight detection sensor 164 and outputs detection information to the system control unit 50.

Based on the detection information acquired from the line-of-sight detecting circuit 165, the system control unit 50 determines that the user is gazing at a specific area in a case where a duration during which the line-of-sight position of the user is fixed into the specific area exceeds a predetermined duration. Therefore, the specific area is a position (gaze position) at which the user is gazing. Here, "the line-of-sight position is fixed into the specific area" means, for example, that the average position of the line-of-sight movement is located within the specific area until the predetermined duration elapses, and the variation (dispersion) is smaller than a predetermined value. The predetermined duration can be arbitrarily changed by the system control unit 50.

A nonvolatile memory 56 is an electrically erasable/recordable memory, such as a FLASH-ROM. The nonvolatile memory 56 records constants, programs, and the like for the operation of the system control unit 50. Here, the program is a program for executing various flowcharts described below in this embodiment.

The system control unit 50 is a control unit including at least one processor or circuit, and controls the entire digital camera 100. The system control unit 50 executes the programs recorded in the nonvolatile memory 56 and realizes each processing according to this embodiment, which will be described below. A system memory 52 is, for example, a RAM. The system control unit 50 decompresses constants and variables for operation of the system control unit 50 and programs read out of the nonvolatile memory 56 into the system memory 52. The system control unit 50 also performs display control by controlling the memory 32, the display unit 28, and the like.

A recording medium 200 is a recording medium such as a memory card for recording captured images, and includes a semiconductor memory, a magnetic disk, or the like.

A communication unit 54 transmits and receives video signals and audio signals to and from an external device connected wirelessly or by a wired cable. The communication unit 54 can be connected to a wireless Local Area Network (LAN) and the Internet. The communication unit 54 can communicate with an external device using Bluetooth (registered trademark) or Bluetooth Low Energy. The communication unit 54 can transmit images (including LV images) captured by the imaging unit 22 and images recorded in the recording medium 200, and can receive image data and other various information from external devices.

An orientation detector 55 detects the orientation of the digital camera 100 relative to the gravity direction. The orientation detector 55 can use an acceleration sensor, a gyro sensor, or the like. The orientation detector 55 can detect the tilt and movement of the digital camera 100 (pan, tilt, lift, and whether it is stationary or not) using an acceleration sensor or a gyro sensor. A spirit level based on the detected tilt may be displayed on the display unit 28 or the EVF 29.

An eye approach detector 57 is, for example, an infrared proximity sensor, and detects the proximity (eye approach) and separation (eye separation) of the eyeball (object) 161 relative to the eyepiece unit 16 of the viewfinder incorporating the EVF 29. In a case where an object approaches, the infrared rays projected from the light projector of the eye approach detector 57 are reflected by the object and received by the light receiver. Based on an amount of received infrared rays, the eye approach detector 57 can determine how far the object is from the eyepiece unit 16 (eyepiece distance). Thus, the eye approach detector 57 performs eye approach detection for detecting the proximity distance of the object to the eyepiece unit 16. The eye approach detector 57 detects the eye approach in a case where an object approaching within a predetermined distance from the eyepiece unit 16 is detected in the non-eye-approach state (non-approaching state). The eye approach detector 57 detects the eye separation in a case where the object whose proximity has been detected moves away from the eye approach state (approaching state) by a predetermined distance or more. The threshold for detecting the eye approach and the threshold for detecting eye separation may be different, for example, by providing hysteresis. After the eye approach is detected, the eye approach state is maintained until the eye separation is detected. After the eye separation is detected, the eye separation state is maintained until the eye approach is detected. The infrared proximity sensor is merely illustrative, and other sensors may be employed as the eye approach detector 57 as long as they can detect the eye or object approach that can be regarded as eye approach.

The system control unit 50 switches each of the display unit 28 and the EVF 29 between display (display state)/non-display (non-display state) according to the state detected by the eye approach detector 57. More specifically, at least in the imaging standby state and in a case where the switching of the display destination is automatic, the display destination is set to the display unit 28, its display is turned on while the display of the EVF 29 is turned off. During the eye approach, the display destination is set to the EVF 29, its display is turned on, and the display of the display unit 28 is turned off.

The system control unit 50 can detect the following operations or states of the eyepiece unit 16 by using the detection information acquired from the line-of-sight detecting circuit 165 and by controlling the eye approach detector 57:

(1) That the line of sight that was not directed to the eyepiece unit 16 is now directed to the eyepiece unit 16. That is, a start of a line-of-sight input.
(2) A state in which the line of sight is being input to the eyepiece unit 16.
(3) A state in which the user is gazing at the eyepiece unit 16.
(4) That the line of sight directed to the eyepiece unit 16 is removed. That is, an end of a line-of-sight input.
(5) A state in which no line of sight is input to the eyepiece unit 16.

The system control unit 50 is notified of these operations/states and the position (direction) in which the line of sight is directed to the eyepiece unit 16 via an internal bus, and the system control unit 50 determines what kind of operation (line-of-sight operation) has been performed.

The operation unit 70 receives various operations. An operation received by the operation unit 70 can be transmitted to the image processing unit 24 via the internal bus. The display range, position, etc. of the generated partial image can be adjusted or set by the operation of the user via the operation unit.

In this embodiment, the image processing unit 24, the system control unit 50, and the line-of-sight detector 160 constitute a control apparatus configured to control the display apparatus.

Figure 2A:
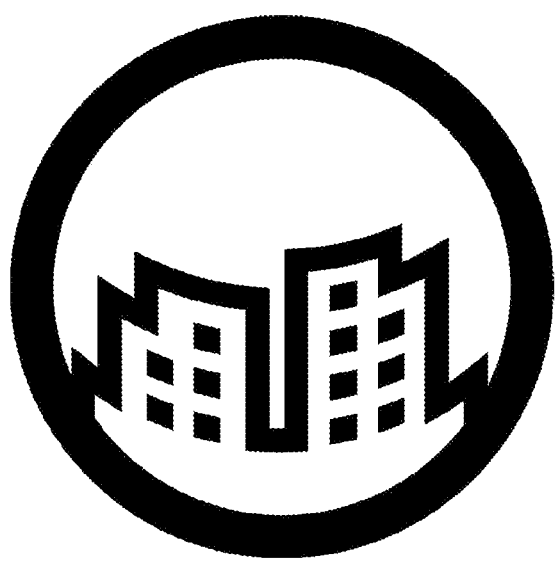
FIGS. 2A and 2B explain a method for generating a hemispherical image.
Figure 2B:
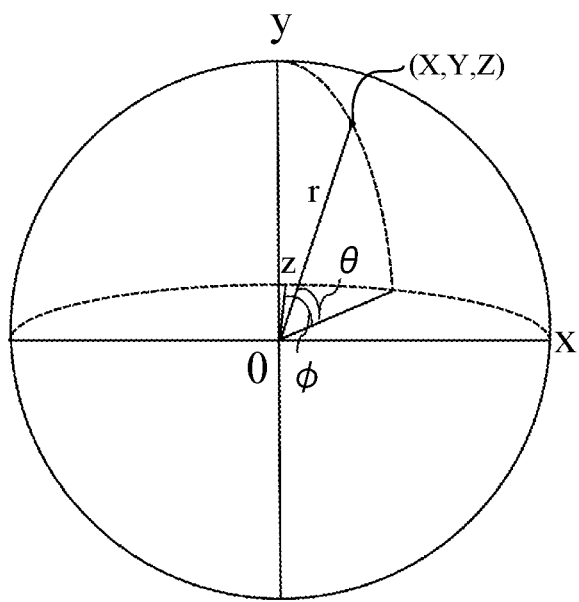

Referring now to FIGS. 2A and 2B, a description will be given of a method of generating a hemispherical image that is used in viewing VR according to this embodiment.

Figure 3:
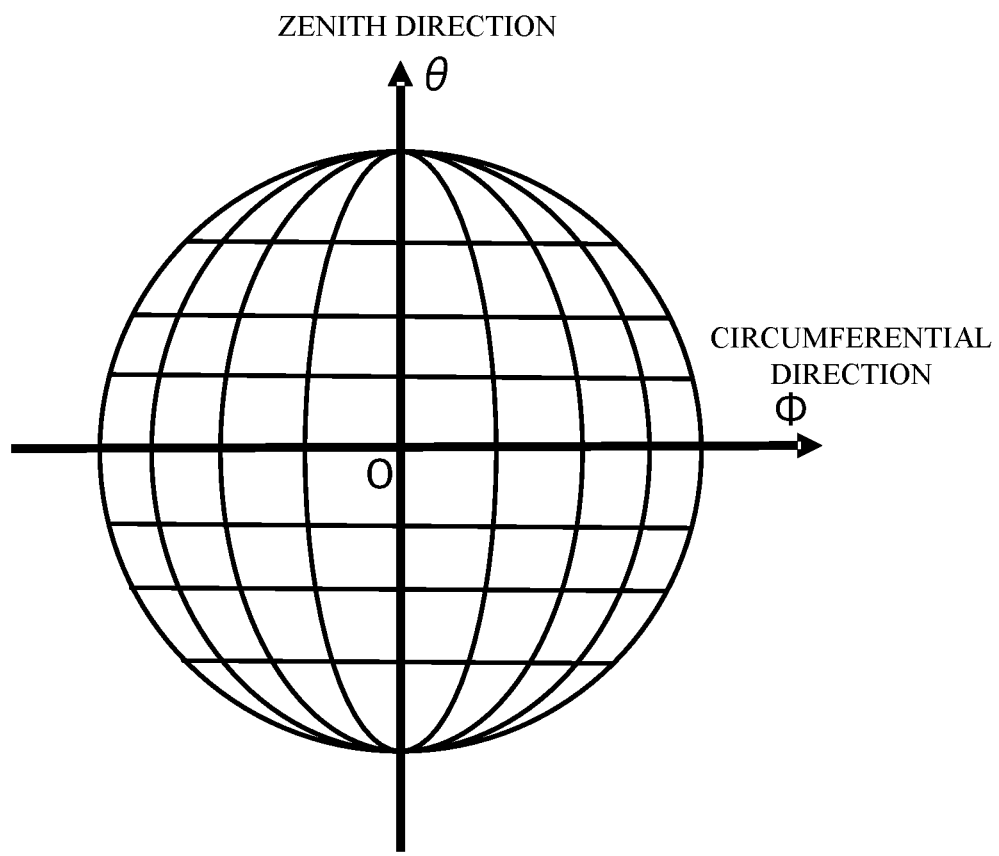
FIG. 3 illustrates the correspondence between a fisheye image and a hemisphere in three-dimensional virtual space.

FIG. 2A illustrates an image captured by the digital camera 100 using a fisheye lens. As illustrated in FIG. 2B, the fisheye image captured by the imaging unit 22 is a circularly distorted image. The image processing unit 24 draws the hemisphere illustrated in FIG. 2B using, for example, a two-dimensional/three-dimensional computer graphics library such as Open GL (Open Graphics Library). More specifically, as illustrated in FIG. 3, the fish-eye image is associated with a coordinate system that has a vertical angle θ about the zenith direction as an axis of the captured image and a horizontal angle φ about the axis in the zenith direction (axis in a circumferential direction). In a case where the viewing angle range of the fisheye image is 180°, each of the vertical angle θ and the horizontal angle φ has an angular range of −90° to 90°. The position (θ, φ), which is the coordinate value of the fisheye image, can be associated with each point on the spherical surface representing the hemispherical image illustrated in FIG. 2B. As illustrated in FIG. 2B, in a case where the center of the hemisphere is set to 0 and the three-dimensional coordinates on the spherical surface are set to (X, Y, Z), the three-dimensional coordinates (X, Y, Z) can be expressed by two-dimensional coordinates of the fisheye image and the following equations (1) to (3):

$$X = r \cos \theta \sin \varphi \quad (1)$$

$$Y = r \sin \theta \quad (2)$$

$$Z = r \cos \theta \cos \varphi \quad (3)$$

where r is a radius of the hemisphere. The hemispherical image can be generated in the three-dimensional virtual space by pasting the fisheye image inside the hemisphere based on the coordinate correspondences expressed by equations (1) to (3).

Fisheye images of 180° forward and 180° backward of the photographer are acquired, each hemispherical image (half-celestial-sphere image) is generated using the method described above, and a 360° omnidirectional image (celestial-sphere image) can be generated by combining them.

As described above, the omnidirectional image and the hemispherical image are images that are pasted so as to cover the spherical surface, and thus they may cause an uncomfortable sense if they are used as they are. Accordingly, a predetermined projection transformation is performed for a partial area of the image and displaying it as a less distorted partial image can generate an image that does not give an uncomfortable sense.

A description will now be given of perspective projection transformation as an example of projection transformation, but another transformation processing may be used as long as an omnidirectional/hemispherical image can be partially displayed.

Figure 4:
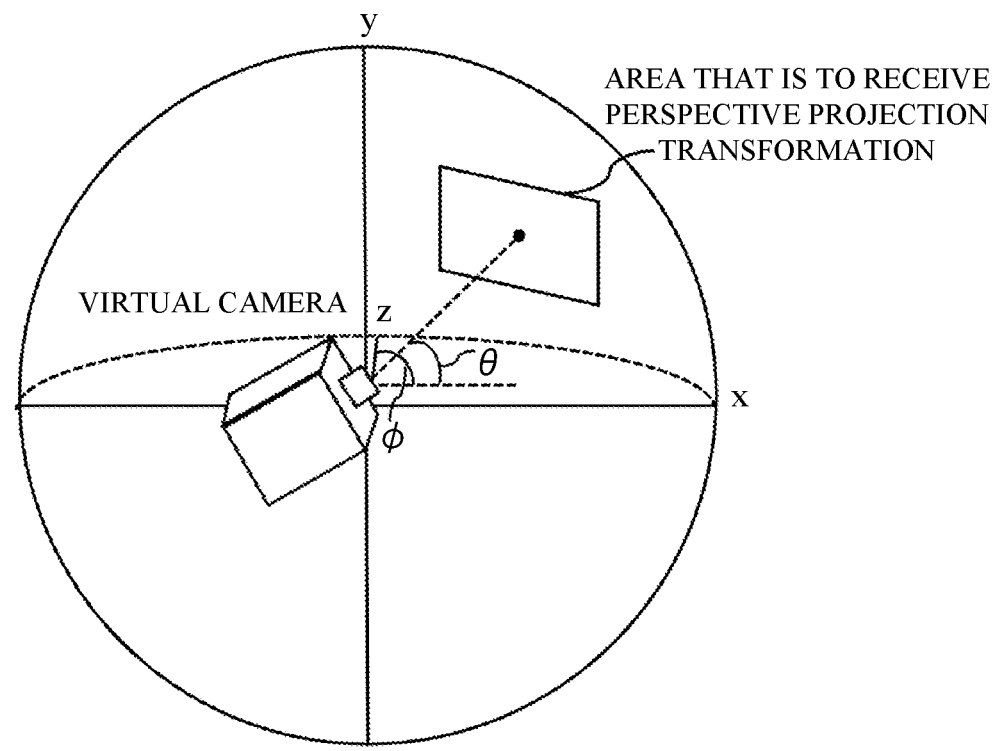
FIG. 4 illustrates positions of a virtual camera and an area where the perspective projection transformation is performed in the three-dimensional virtual space in the hemispherical image.

FIG. 4 illustrates the positions of a virtual camera and an area where perspective projection transformation is performed in a three-dimensional virtual space of a hemispherical image. The virtual camera corresponds to the viewpoint position of the user viewing the omnidirectional image displayed as a three-dimensional sphere. The area where the perspective projection transformation is performed is determined by the information (θ, φ) indicating the direction of the virtual camera and the angle of view, and the image of this area is displayed on the display unit 28 or the EVF 29.

A description will now be given of the viewpoint movement operation during perspective projection display of the digital camera 100 according to each embodiment.

First Embodiment

Figure 5:
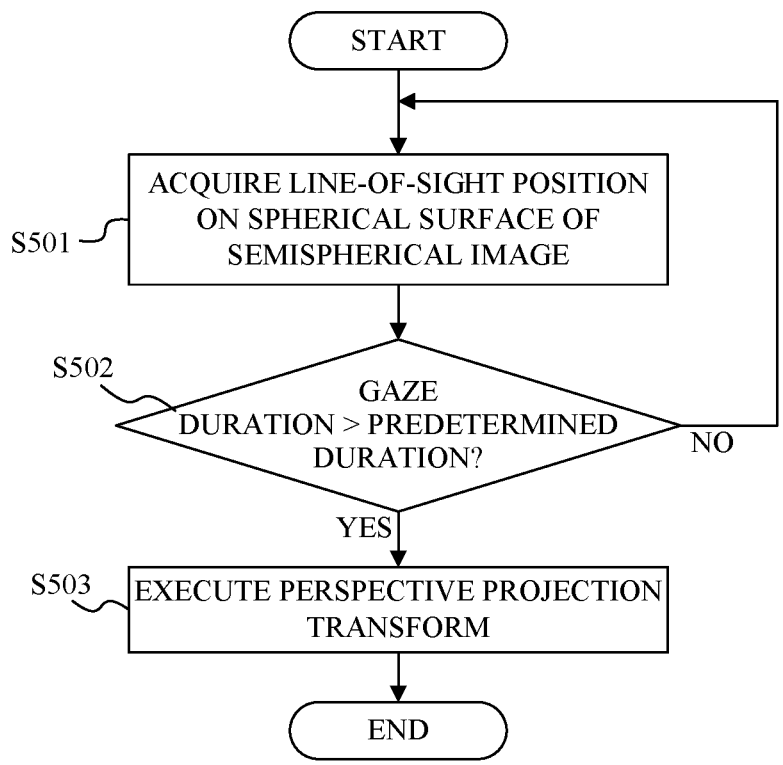
FIG. 5 is a flowchart illustrating a viewpoint movement operation during perspective projection display according to the first embodiment.

FIG. 5 is a flowchart illustrating a viewpoint movement operation during perspective projection display of the digital camera 100 according to this embodiment. Each step in the flowchart of FIG. 5 is implemented by the system control unit 50 decompressing the program stored in the nonvolatile memory 56 into the system memory 52 and executing the program to control each functional block.

Figure 6C:
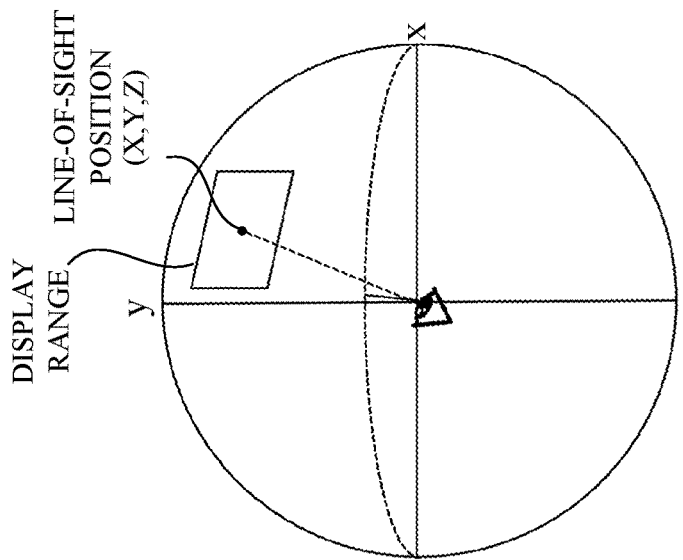
FIGS. 6A, 6B, and 6C illustrate the perspective projection transformation in the hemisphere image in the first embodiment.
Figure 6B:
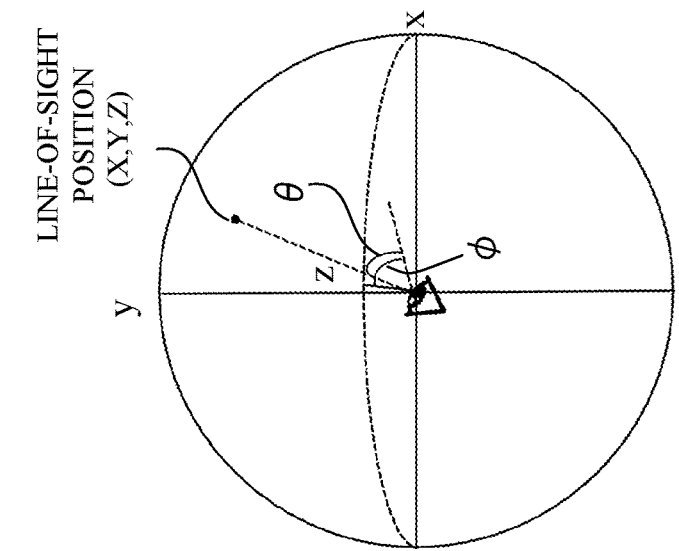
Figure 6A:
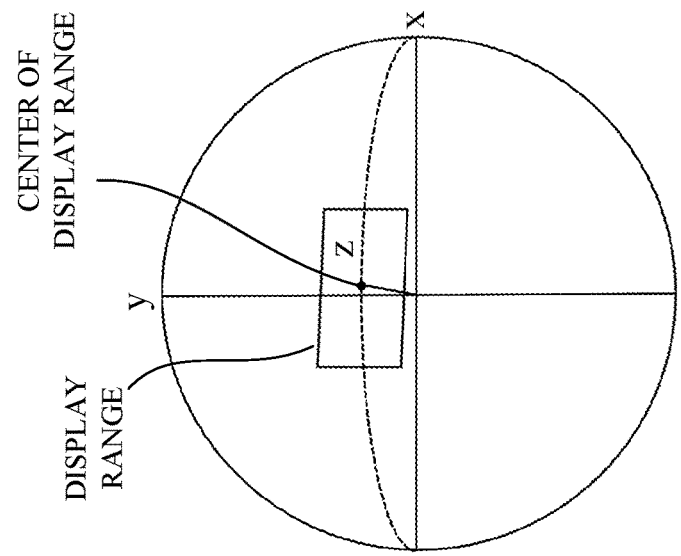

FIGS. 6A, 6B, and 6C illustrate perspective projection transformation in a hemispherical image according to this embodiment.

As illustrated in FIG. 6A, the EVF 29 displays a partial image in which a partial area of the hemispherical image undergoes perspective projection transform by the image processing unit 24. The processing of the flowchart of FIG. 5 is started in a case where the system control unit 50 detects that the user has approached the eyepiece unit 16, as illustrated in FIG. 6B.

In step S501, the system control unit 50 acquires information (θ, φ) about the user's line-of-sight direction from the line-of-sight detector 160 by the corneal reflection method, where θ is an elevation angle of the line of sight, and φ is an angle of the line of sight in the circumferential direction. The system control unit 50 acquires a line-of-sight position (X, Y, Z) (first position) of the user on the spherical surface in the hemispherical image illustrated in FIG. 6B. In this embodiment, the system control unit 50 and the line-of-sight detector 160 function as a detector that detects a line-of-sight position of the user on the display surface. In the initial state before the gaze position is finalized in step S502, which will be described below, the line-of-sight position (X, Y, Z) is set assuming that the information (θ, φ) is (0, 0).

In step S502, the system control unit 50 determines whether or not a duration for gazing at the line-of-sight position acquired in step S501 (gaze duration during which the line-of-sight position is fixed (located within a predetermined area)) becomes longer than a predetermined duration. In a case where the gaze duration becomes longer than the predetermined duration, step S503 is executed, and otherwise, step S501 is executed.

In step S503, the system control unit 50 controls the image processing unit 24 to perform the perspective projection transformation with the line-of-sight position as a center acquired in step S501. Thereby, as illustrated in FIG. 6C, a partial image (first partial image) with the line-of-sight position as a center is generated.

As described above, the configuration of this embodiment can move the viewpoint in partially displaying a wide-angle image without requiring the user to touch the operation member.

Although the absolute position specification (designation) described in the second embodiment is performed in this embodiment, relative position specification may be performed instead of absolute position specification.

Second Embodiment

Figure 7A:
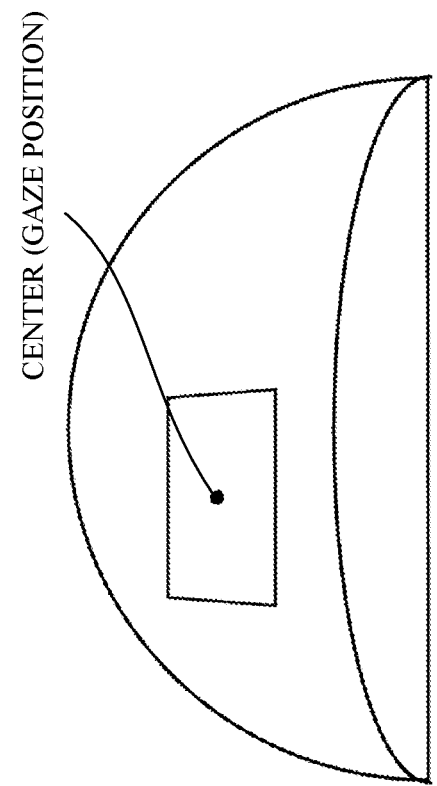
FIGS. 7A and 7B explain a difference between absolute position specification (specifying an absolute position) and relative position specification (specifying a relative position).
Figure 7A:
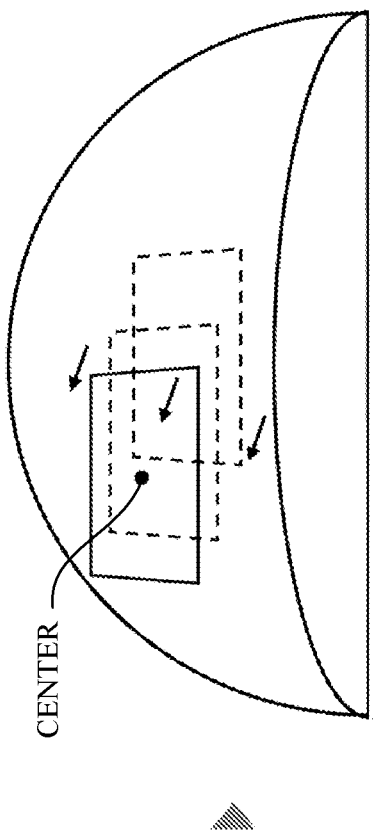

As illustrated in FIG. 7A, the first embodiment performs perspective projection transformation with an actual gaze position as a center in a case where the user gazes at a specific position. However, there is a limit to an angle at which the user can direct his line of sight and thus the user has difficulty in viewing or cannot view that position depending on the angle of the line of sight. Accordingly, this embodiment switches a method of specifying a perspective projection display position according to the angle of the line of sight.

Figure 7B:
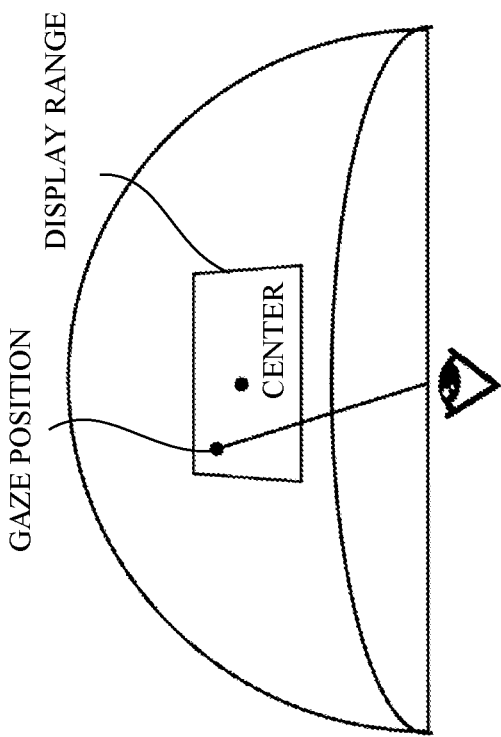
Figure 7B:
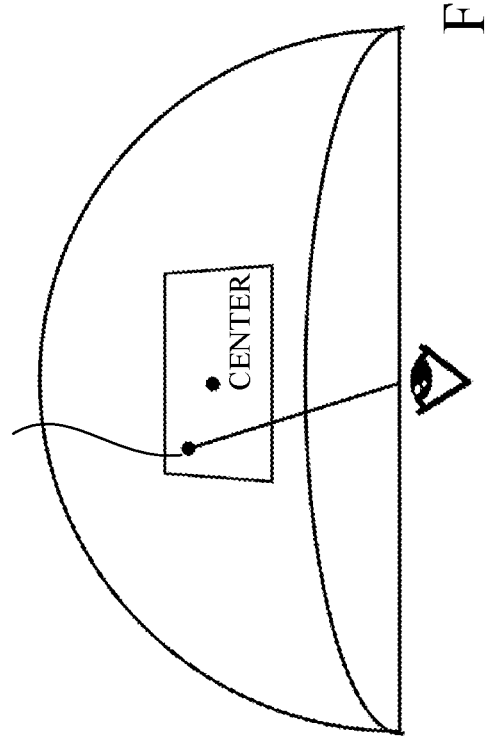

In a case where the angle of the line of sight of the user is greater than a predetermined value, a perspective projection range is continuously moved in the gaze direction by a predetermined amount every predetermined time unit, as illustrated in FIG. 7B. Hereinafter, for the sake of convenience, the specifying method that performs the perspective projection with the actual gaze position as the center described in the first embodiment will be referred to as absolute position specification, and a specifying method that continues to move (shift) a perspective projection display range in the gaze direction described in this embodiment will be referred to as relative position specification.

Figure 8:
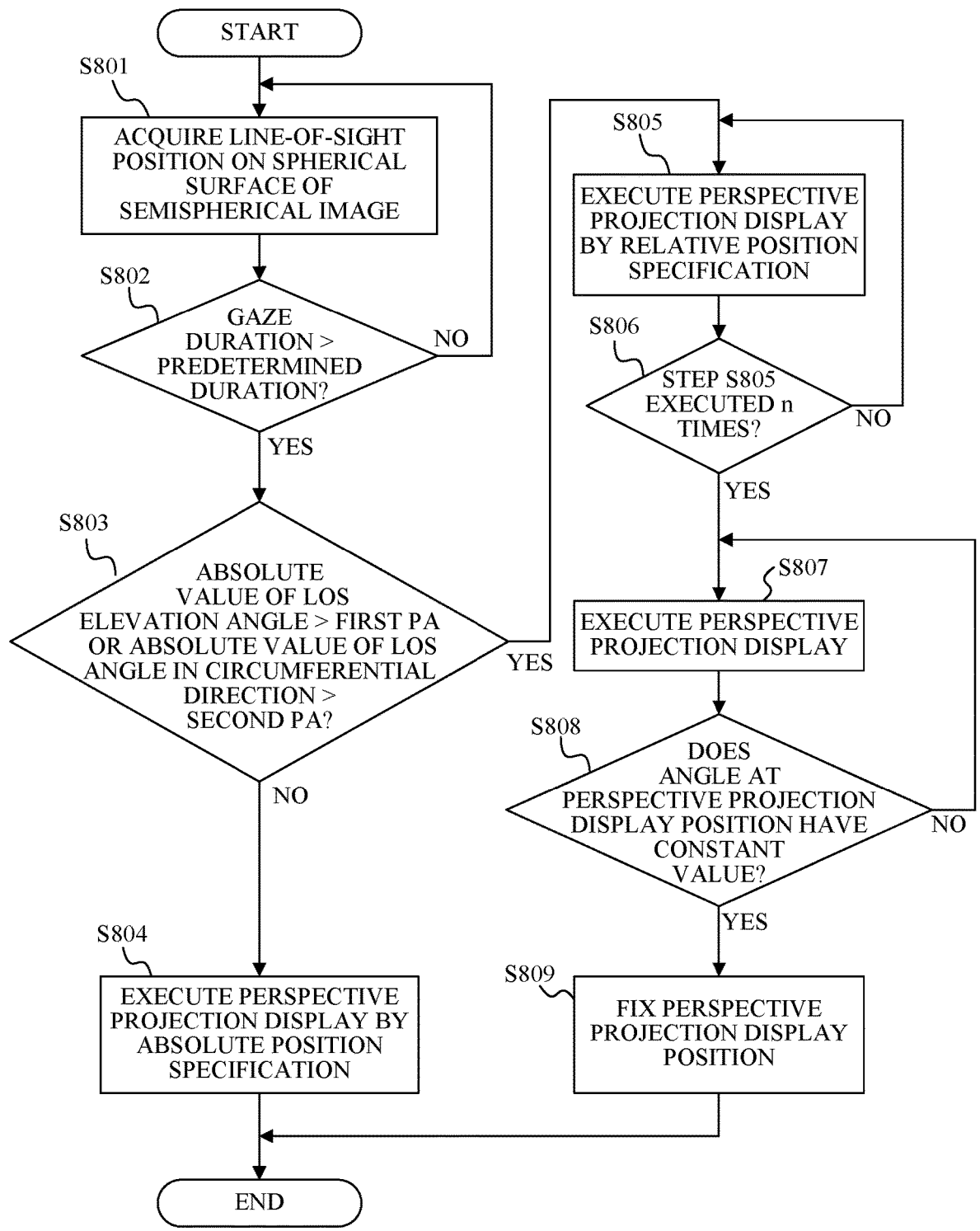
FIG. 8 is a flowchart illustrating a viewpoint movement operation during perspective projection display according to a second embodiment.

FIG. 8 is a flowchart illustrating a viewpoint movement operation during perspective projection display in this embodiment. Steps S801 and S802 in FIG. 8 correspond to steps S501 and S502 in FIG. 5, respectively, and thus a description thereof will be omitted.

In step S803, the system control unit 50 determines whether the absolute value of the line-of-sight (LOS) elevation angle θ acquired in step S801 exceeds a first predetermined angle ($1^{ST}$ PA), or whether the absolute value of the line-of-sight angle φ in the circumferential direction exceeds a second predetermined angle ($2^{ND}$ PA). The first and second predetermined angles are set to angles at which the user inputting a line of sight has difficulty in viewing. The "angle at which the user has difficulty in viewing" is, for example, an angle larger than 60°. In a case where the system control unit 50 determines that the absolute value of the line-of-sight elevation angle θ exceeds the first predetermined angle or the absolute value of the line-of-sight angle φ in the circumferential direction exceeds the second predetermined angle, the flow proceeds to step S805, and otherwise, step S804 is performed.

In step S804, the system control unit 50 executes perspective projection display by the absolute position specification, similarly to step S503 in FIG. 5.

In step S805, the system control unit 50 executes perspective projection display by the relative position specification based on the line-of-sight position determined by the line-of-sight elevation angle θ and the line-of-sight angle Y in the circumferential direction acquired in step S801.

Figure 9E:
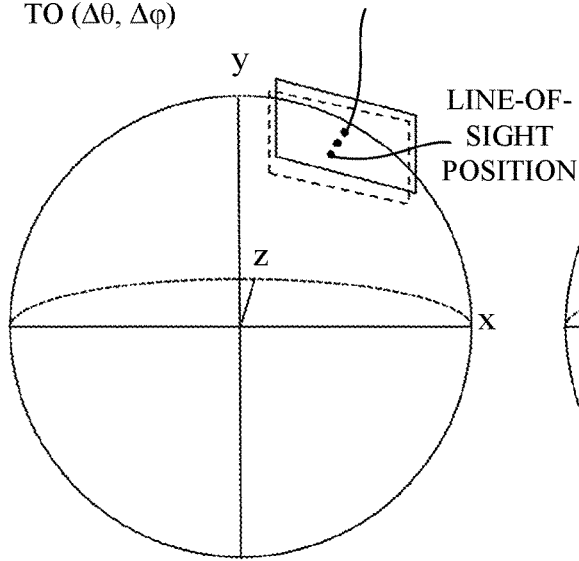

FIGS. 9A to 9F illustrate perspective projection display by the relative position specification. An initial perspective projection display position is determined by information (θ$_0$, φ$_0$), as illustrated in FIG. 9A. FIG. 9B illustrates information (θ', φ') moved from the information (θ$_0$, φ$_0$) by a predetermined amount. The information (θ', φ') can be expressed by the following equations (4) and (5) using the information (θ, φ) acquired in step S801.

$$\theta'=\theta-\theta_0 \quad (4)$$

$$\varphi'=\varphi-\varphi_0 \quad (5)$$

Where (Δθ', Δφ') is a value obtained by dividing the information (θ', φ') by a predetermined value n, three-dimensional coordinates $(X_1, Y_1, Z_1)$ (second position) on the spherical surface in the hemispherical image corresponding to information $(\theta_0+\Delta\theta', \varphi_0+\Delta\varphi')$ can be obtained from the equations (1) to (3). Then, as illustrated in FIG. 9C, perspective projection display with the three-dimensional coordinates $(X_1, Y_1, Z_1)$ as a center is performed. Next, after a predetermined time has passed, as illustrated in FIG. 9D, perspective projection display is performed with the three-dimensional coordinates $(X_2, Y_2, Z_2)$ as a center corresponding to the position $(\theta_0+2\Delta\theta', \varphi_0+2\Delta\varphi')$ is performed.

The above processing is performed until the system control unit 50 determines that the above processing has been executed n times in step S806, which will be described below. In a case where this processing is executed n times, the perspective projection display position coincides with the three-dimensional coordinates corresponding to the acquired information (0, Y).

In step S806, the system control unit 50 determines whether step S805 has been executed n times. In a case where the system control unit 50 determines that step 805 has been executed n times, step S807 is performed, and otherwise, step S805 is performed.

In step S807, the system control unit 50 adds a value (Δθ, Δφ) obtained by dividing the obtained information (θ, φ) by the predetermined value m, to an angle at the last perspective projection position as illustrated in FIG. 9E, and performs perspective projection display with a three-dimensional position corresponding to the added angle.

In step S808, the system control unit 50 determines whether the angle at the perspective projection display position is a constant value. Here, the constant value is a value that exceeds the display range of the hemispherical image and, for example, an angle in the zenith direction or the circumferential direction is ±90°. In a case where the system control unit 50 determines that the angle at the perspective projection display position is the constant value, step S809 is executed, and otherwise, step S807 is executed.

Figure 9F:
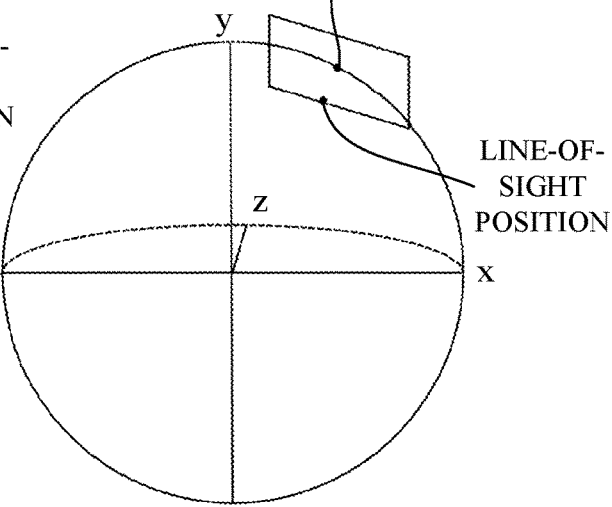

In step S809, the system control unit 50 fixes the perspective projection display position at the three-dimensional position corresponding to the angle determined in step S808, as illustrated in FIG. 9F, so as not to display a portion exceeding the display range of the hemispherical image.

As described above, the configuration of this embodiment can easily move the viewpoint in partially displaying a wide-angle image, even if the user wishes to check an area that is difficult to view in the periphery of the image.

Third Embodiment

The first embodiment moves only the viewpoint using a line-of-sight input, whereas this embodiment enables a viewpoint movement operation using a line-of-sight input, a gyro, and a combination thereof during playback image display. This embodiment prohibits the viewpoint movement operation using the gyro during imaging because the viewpoint movement operation using the gyro may shift an object from a position intended by the user.

Figure 10A:
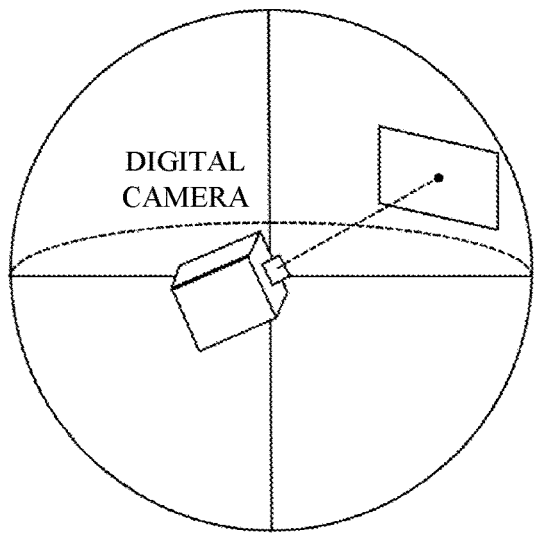
FIGS. 10A and 10B illustrate the perspective projection display in a gyro mode and a combination mode according to a third embodiment.

In the viewpoint movement operation using the gyro, a perspective projection display position (third position) is determined according to tilt of the body, as illustrated in FIG. 10A. Since the tilt and pan, which are tilt amounts of the digital camera 100 detected by the orientation detector 55, correspond to the vertical angle θ and horizontal angle φ in FIG. 4, three-dimensional coordinates can be obtained in the hemispherical image from equations (1) to (3). Performing perspective projection display with the obtained three-dimensional coordinates as a center can perform the viewpoint movement operation using the gyro.

Figure 10B:
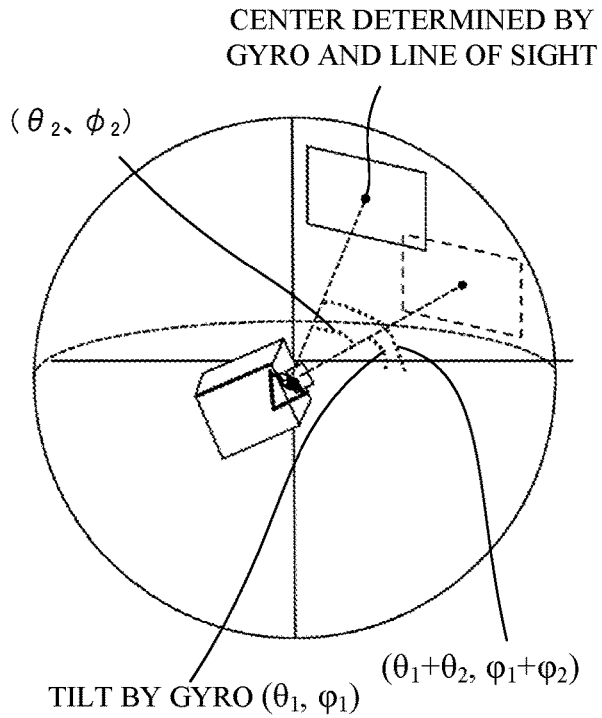

In a viewpoint movement operation using a combination of the line-of-sight input and the gyro, the perspective projection display position is determined by adding the tilt of the digital camera 100 and the line-of-sight angle, as illustrated in FIG. 10B. Where $(\theta_1, \varphi_1)$ is tilt information of the digital camera 100 detected by the orientation detector 55, and $(\theta_2, \varphi_2)$ is information detected by the line-of-sight detector 160. A perspective projection display position (fourth position) is determined by the combination information $(\theta_1+\theta_2, \varphi_1+\varphi_2)$ obtained by adding them. Hereinafter, for the sake of convenience, the viewpoint movement operation using the line-of-sight input will be referred to as a line-of-sight mode, the viewpoint movement operation using tilt of the camera body will be referred to as a gyro mode, and the viewpoint movement operation using a combination of them will be referred to as a combined mode.

Figure 11:
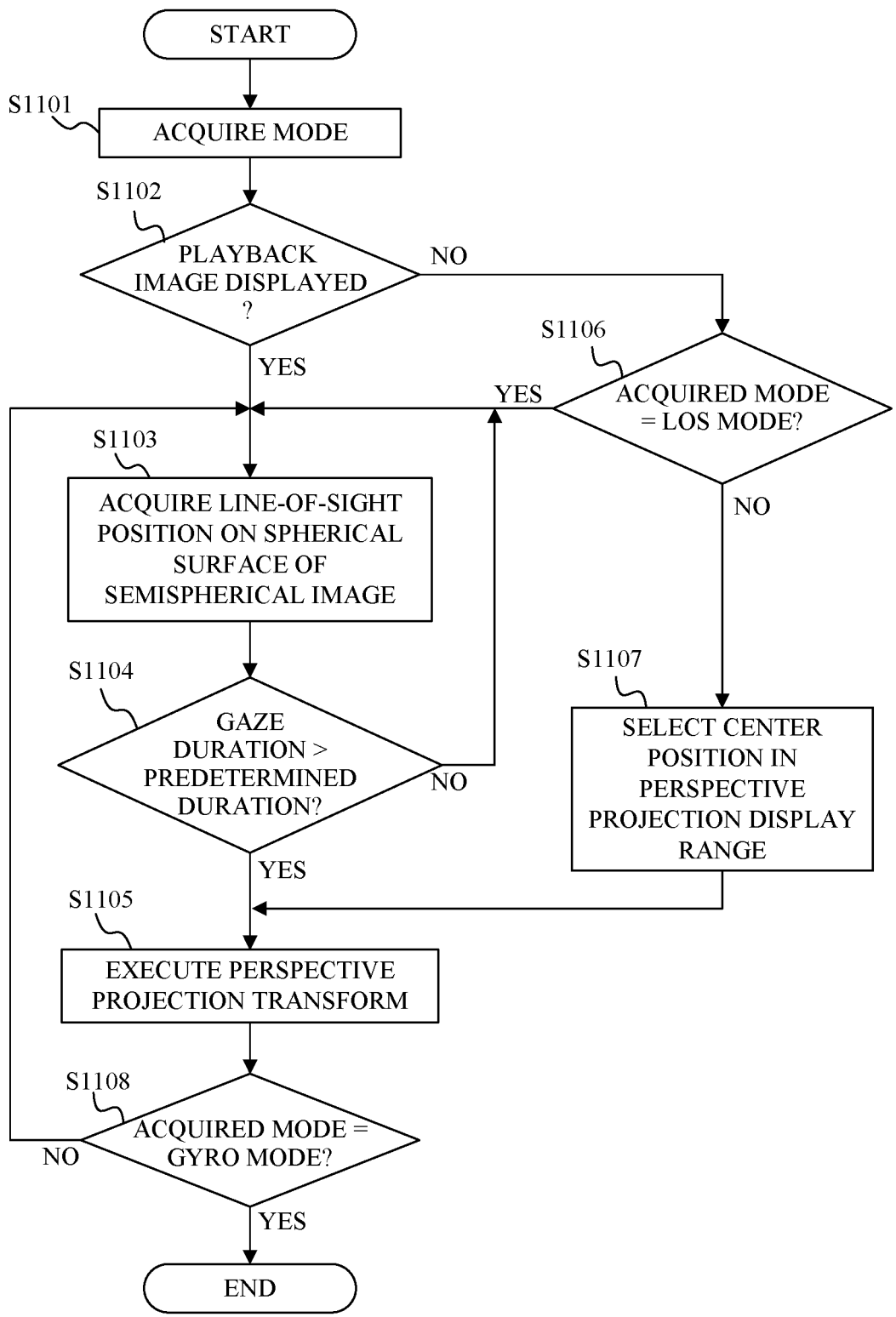
FIG. 11 is a flowchart illustrating a viewpoint movement operation during perspective projection display according to the third embodiment.

FIG. 11 is a flowchart illustrating viewpoint movement operation during perspective projection display in this embodiment.

In step S1101, the system control unit 50 acquires the mode for performing the viewpoint movement operation selected by the user through various operations performed on the operation unit 70.

In step S1102, the system control unit 50 determines whether or not it is playback image display. In a case where the system control unit 50 determines that it is the playback image display, step S1103 is executed, and otherwise, that is, in a case where the system control unit 50 determines that it is LV image display, step S1106 is executed.

Steps S1103 to S1105 in FIG. 11 correspond to steps S501 to S503 in FIG. 5, respectively, and a description thereof will be omitted.

In step 1106, the system control unit 50 determines whether the mode acquired at step S1101 is a line-of-sight mode. In a case where the system control unit 50 determines that the acquired mode is the line-of-sight mode, step S1103 is executed, and otherwise, that is, in a case where the system control unit 50 determines that the acquired mode is the gyro mode or the combined mode, step S1107 is executed.

In step S1107, the system control unit 50 selects the center position of the perspective projection display range according to the tilt of the digital camera 100 detected by the orientation detector 55. Thereafter, step S1105 is executed.

In step S1105, perspective projection transformation is performed with the three-dimensional coordinates as a center in the hemispherical image corresponding to the selected position, and as illustrated in FIG. 10A, perspective projection display with the selected position as a center is performed.

In step S1108, the system control unit 50 determines whether the acquired mode is the gyro mode. In a case where the system control unit 50 determines that the selected mode is the gyro mode, this flow ends. In a case where the system control unit 50 determines that the obtained mode is not the gyro mode, that is, the combined mode, step S1103 is executed. In step S1103, the position is determined by adding the tilt of the camera body and the line-of-sight angle, and perspective projection display with the determined position as a center is performed.

As described above, the configuration of this embodiment enables the user to select a suitable viewpoint movement operation method in partially displaying a wide-angle image.

Fourth Embodiment

Photos and videos for VR include those that are stereoscopically viewable using a parallax between two eyes. At this time, a wide-angle image for the right eye and a wide-angle image for the left eye are acquired. However, the digital camera 100 can perform perspective projection display only for one of the wide-angle images. Accordingly, this embodiment switches the image displayed on the EVF 29 between the right-eye image and the left-eye image (images captured from a plurality of viewpoints) based on the intentional (conscious) blink (closing of both eyes) of the user. In this embodiment, the line-of-sight detector 160 can determine an intentional blink of the user.

Figure 12:
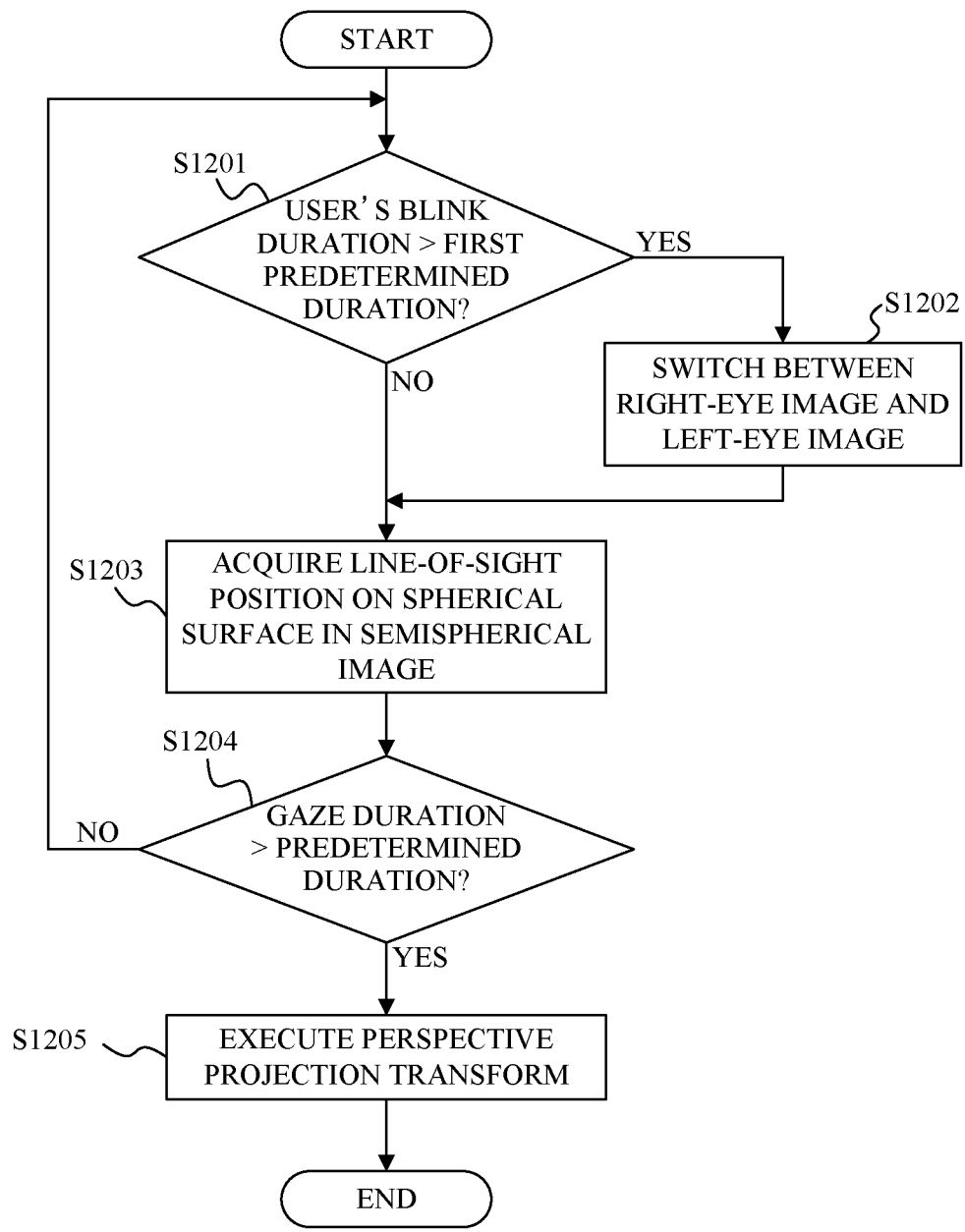
FIG. 12 is a flowchart illustrating a viewpoint movement operation during perspective projection display according to a fourth embodiment.

FIG. 12 is a flowchart illustrating a viewpoint movement operation during perspective projection display according to this embodiment.

In step S1201, the system control unit 50 controls the line-of-sight detector 160 and determines whether the blink duration of the user on the EVF 29 exceeds (is longer than) a first predetermined duration. Since erroneous determination may occur due to the user's unintentional (unconscious) blink, the user's intentional blink is determined. "intentional brink" means, for example, the state of the user changes from an open-eye state to a closed-eye state, and the closed-eye state continues for the first predetermined duration (such as 300 ms) or longer. In a case where the system control unit 50 determines that the blink duration has exceeded the first predetermined duration, step S1202 is executed, and otherwise, step S1203 is executed.

In step S1202, the system control unit 50 controls the image processing unit 24 and switches between the right-eye image and the left-eye image. If perspective projection display is first performed for the wide-angle image for the right eye, switching can be performed by applying the hemispherical image generating method again to the wide-angle image for the left eye.

Step S1203 to step S1205 in FIG. 12 correspond to step S501 to step S503 in FIG. 5, respectively, and a description thereof will be omitted.

As described above, the configuration of this embodiment can switch between the right-eye image and the left-eye image without requiring the user to touch the operation member, in partially displaying a wide-angle image.

The condition for switching between a right-eye image and a left-eye image is set to a blinking duration exceeds the first predetermined duration, but another condition may be used as long as it can determine the intentional blink operation of the user. For example, whether or not the number of blinks exceeds a predetermined number of times may be used. More specifically, the state of the user changes from an open-eye state to a closed-eye state, and the closed-eye state continues for a second predetermined duration (such as 100 ms) and the same condition is satisfied again (two consecutive blinks) within a fourth predetermined duration (such as 1 s).

The condition is not limited to the condition that there was a blinking motion, as long as it can be intentionally established without requiring the user to touch the operation member.

In this embodiment, each embodiment is applied to the digital camera 100 as an example, but this disclosure is not limited to this example. The disclosure is applicable to any display apparatus as long as it has an image processing function and a line-of-sight detecting function and displays a partial image based on a partial area of an image on a display surface. That is, this embodiment is applicable to an HMD that can detect a line of sight. By reading a recording medium in which a wide-angle image is recorded and by generating an omnidirectional or hemispherical image through the image processing function, perspective projection display can be performed in displaying a playback image. Connecting the HMD to the communication unit in the image pickup apparatus with a wireless or wired cable can perform perspective projection display with the HMD during LV display.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

This embodiment can provide a control apparatus, a display apparatus, a control method, and a storage medium, each of which can move a viewpoint in displaying a partial area of an image without requiring the user to touch an operation member.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-133641, filed on Aug. 24, 2022, which is hereby incorporated by reference herein in its entirety.

What is claimed is:

1. A control apparatus configured to control a display apparatus for displaying a partial image based on a partial area of an omnidirectional image or hemispherical image on a display surface, the control apparatus comprising:
- a memory storing instructions; and
- a processor configured to execute the instructions to:
  - generate the partial image by performing transformation processing for the partial area of the omnidirectional image or hemispherical image,
  - detect a first position of a line of sight of a user on the display surface, and
  - generate a first partial image based on the first position and display the first partial image on the display surface in a case where the first position is located within a predetermined area for a predetermined duration,
  - generate a second partial image with a second position as a center that is moved from an original position toward the first position by a predetermined amount every predetermined time, and
  - display the second partial image on the display surface.

2. The control apparatus according to claim 1, wherein the processor is configured to generate the first partial image with the first position as a center.

3. The control apparatus according to claim 1, wherein the omnidirectional image or hemispherical image is a playback image that has been recorded by a recorder.

4. The control apparatus according to claim 3, wherein the omnidirectional image or hemispherical image is a live-view image captured by an image pickup apparatus.

5. The control apparatus according to claim 1, wherein the transformation processing is perspective projection transformation.

6. The control apparatus according to claim 1, wherein the processor is configured to detect an angle of the line of sight of the user, which corresponds to the first position.

7. The control apparatus according to claim 6, wherein the processor is configured to generate the first partial image with the first position as a center in a case where the angle is lower than a predetermined amount, and the processor is configured to generate a second partial image with a second position as a center shifted from an original position toward the first position by a predetermined amount every predetermined time.

8. The control apparatus according to claim 1, wherein coordinates at the first position can be converted into coordinates in the omnidirectional image or hemispherical image.

9. The control apparatus according to claim 1, wherein the partial image is an image generated by performing the transformation processing for the partial area of the omnidirectional image or hemispherical image of one viewpoint among images captured at a plurality of viewpoints.

10. The control apparatus according to claim 9, wherein images captured at the plurality of viewpoints include a right-eye image and a left-eye image.

11. A display apparatus comprising:
- the control apparatus according to claim 1; and
- a display unit.

12. A control method configured to control a display apparatus for displaying a partial image based on a partial area of an omnidirectional or hemispherical image on a display surface, the control method comprising the steps of:
- generating the partial image by performing transformation processing for the partial area of the omnidirectional or hemispherical image,
- detecting a first position of a line of sight of a user on the display surface, and
- generating a first partial image based on the first position and display the first partial image on the display surface in a case where the first position is located within a predetermined area for a predetermined duration,
- generating a second partial image with a second position as a center that is moved from an original position toward the first position by a predetermined amount every predetermined time, and
- displaying the second partial image on the display surface.

13. A non-transitory computer-readable storage medium storing a program that causes a computer to execute the control method according to claim 12.

* * * * *